US007457549B2

United States Patent
Koganei

(10) Patent No.: US 7,457,549 B2
(45) Date of Patent: Nov. 25, 2008

(54) SUB SIGNAL MODULATION APPARATUS, SUB SIGNAL DEMODULATION APPARATUS, AND SUB SIGNAL MODULATION DEMODULATION SYSTEM

(75) Inventor: Youhei Koganei, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 361 days.

(21) Appl. No.: 11/211,492

(22) Filed: Aug. 26, 2005

(65) Prior Publication Data

US 2006/0257152 A1    Nov. 16, 2006

(30) Foreign Application Priority Data

May 13, 2005    (JP) ............... 2005-140803

(51) Int. Cl.
*H04B 10/04*    (2006.01)
*H04B 10/12*    (2006.01)
*H04B 10/08*    (2006.01)
*H04B 17/00*    (2006.01)
*H04J 14/02*    (2006.01)

(52) U.S. Cl. .................. 398/197; 398/30; 398/32; 398/33; 398/94; 398/181

(58) Field of Classification Search .................. 398/30, 398/32, 33, 181, 192, 198, 94, 197
See application file for complete search history.

(56) References Cited

U.S. PATENT DOCUMENTS

| | | | | |
|---|---|---|---|---|
| 5,663,820 | A | 9/1997 | Shiragaki | 359/128 |
| 6,323,978 | B1 * | 11/2001 | Harley et al. | 398/30 |
| 6,574,016 | B1 | 6/2003 | Harley et al. | 359/124 |
| 7,158,290 | B2 * | 1/2007 | Oota et al. | 359/341.4 |
| 7,158,723 | B2 * | 1/2007 | Wan et al. | 398/32 |
| 2004/0223759 | A1 * | 11/2004 | Fee | 398/33 |
| 2005/0084202 | A1 * | 4/2005 | Smith et al. | 385/14 |

FOREIGN PATENT DOCUMENTS

| | | |
|---|---|---|
| JP | 5-267766 | 10/1993 |
| JP | 8-186559 | 7/1996 |
| JP | 2000-134154 | 5/2000 |
| JP | 2000-165357 | 6/2000 |
| JP | 2002-111596 | 4/2002 |
| JP | 2003-510960 | 3/2003 |
| WO | WO 01/24431 | 4/2001 |
| WO | WO 2004040719 A1 * | 5/2004 |

* cited by examiner

*Primary Examiner*—Kenneth N Vanderpuye
*Assistant Examiner*—Daniel G Dobson
(74) *Attorney, Agent, or Firm*—Staas & Halsey LLP

(57) ABSTRACT

A sub signal modulation apparatus, with the intention of stabilized transmission of a sub signal superimposed on main signal light irrespective of the intensity of the main signal light when used in a general-purpose main signal transmitter, including a sub signal outputting unit; a variable optical attenuator for variably attenuating main signal light, into which the main signal has been modulated, at a response speed lower than $\frac{1}{2}$ of a speed of the main signal; an attenuation determining unit for determining, in accordance with the sub signal output from the sub signal outputting unit, an attenuation of the variable optical attenuator for the main signal light; and a stabilizing controller for controlling the attenuation determining unit such that an amplitude of the attenuation of the variable optical attenuator is stabilized to have a constant ratio to a mean intensity of the main signal light.

4 Claims, 5 Drawing Sheets

SUB SIGNAL MODULATION APPARATUS, SUB SIGNAL DEMODULATION APPARATUS, AND SUB SIGNAL MODULATION DEMODULATION SYSTEM

BACKGROUND OF THE INVENTION

1. Field of the Invention

The present invention relates to a sub signal modulation apparatus, a sub signal demodulation apparatus and a sub signal modulation demodulation system which are preferably used in an optical fiber communication system in which a sub signal is superimposed on a main signal and is sent and received.

2. Description of the Related Art

In a conventional communication system using optical fibers for transmission paths, additive information such as monitoring information over transmission paths has been regarded as a sub signal with respect to a main signal serving as a data signal and is sent and received along with the main signal.

Further, transceivers conforming to MSA (Multi Source Agreement) in which a semiconductor laser or an external modulator is included in an optical interface comes to be frequently used as an optical communication apparatus for an optical fiber communication. A normal MSA transceiver is not equipped with a function for sending and receiving a sub signal and therefore requires addition of such a function to the optical communication apparatus in order to realize sub signal communication.

A technique disclosed in patent reference 1 (see the list below) superimposes a sub signal on a main signal which sub and main signals are electric signals and uses the electric signal obtained by the superimposition to control a drive current in a semiconductor laser or an external modulator, so that a light signal in which the sub signal and the main signal are modulated is output.

A technique disclosed in patent reference 2 (also see the list below) incorporates a wave ID insertion unit into a 2R transceiver which insertion unit includes a wave ID modulator for modulating auxiliary data and an intensity modulator for performing an intensity modulation on a light data signal based on the auxiliary data modulated in the wave ID modulator.

In addition to patent references 1, 2, the following patent references 3-6 also disclose techniques having relation to the present invention.

[patent reference 1] Kokai (Unexamined Patent Publication) No. 2002-111596

[patent reference 2] Kokai (Unexamined Patent Publication) No. 2000-165357

[patent reference 3] Kokai (Unexamined Patent Publication) No. HEI 5-267766

[patent reference 4] Kohyo (Unexamined Patent Publication) No. 2003-510960

[patent reference 5] Kokai (Unexamined Patent Publication) No. 2000-134154

[patent reference 6] Kokai (Unexamined Patent Publication) No. HEI 8-186559

Nevertheless, the technique of the patent reference 1 requires a circuit configuration to superimpose a sub signal and a main signal, both electric signals, in the transceiver, and there is a need for a transceiver to which a particular function for subsignal modulation is added. For this reason, it is difficult to apply the technique of the patent reference 1 to a normal MSA transceiver without a sub signal modulation function.

Since the patent reference 2 incorporates the wave ID insertion unit, which modulates a sub signal, in the transceiver, the patent reference 2 has the same problems as the patent reference 1. Besides, partly since of the patent reference 2 does not have a configuration for stabilizing the amplitude of a sub signal and partly since, if the level of a light data signal to be receive varies, a relative level of the amplitude of the sub signal to an intensity of the light data signal also varies, it is difficult to stably transmit the sub signal.

The patent references 3-6 do not disclose techniques able to solve the above problem that a sub signal cannot be stably transmitted which problem is caused by a variation in relative level of the amplitude of the sub signal to the intensity of main signal light serving as light data signal.

SUMMARY OF THE INVENTION

With the foregoing problems in view, the object of the present invention is to stabilize, irrespective of the intensity of main signal light, transmission of a sub signal that is superimposed on the main signal light in a general-purpose main signal light transmitter.

To attain the above object, as a first generic feature, there is provided a sub signal modulation apparatus comprising: a sub signal outputting unit for outputting a sub signal different from a main signal; a variable optical attenuator for variably attenuating main signal light, into which the main signal has been modulated, at a response speed lower than ½ of a speed of the main signal; an attenuation determining unit for determining, in accordance with the sub signal output from the sub signal outputting unit, an attenuation of the variable optical attenuator for the main signal light; and a stabilizing controller for controlling the attenuation determining unit such that an amplitude of the attenuation of the variable optical attenuator is stabilized to have a constant ratio to a mean intensity of the main signal light.

As a preferable feature, the sub signal outputting section may include: a sub signal generating section for generating the sub signal; a phase modulation section for performing phase modulation on the sub signal generated by the sub signal generating section and for sending a result of the phase modulation to the attenuation determining unit.

As another preferable feature, the stabilizing controller may include: a mean intensity measuring section for measuring a mean intensity of signal light output from the variable optical attenuator; a sub signal component extracting section for extracting a sub signal component from the signal light output from the variable optical attenuator; an amplitude measuring section for measuring an amplitude of the sub signal component extracted by the sub signal component extracting section; and a controlling unit for controlling the determining of the attenuation in the attenuation determining section such that the amplitude measured by the amplitude measuring section has a constant ratio to the mean intensity measured by the mean intensity measuring section.

As an additional preferable feature, the attenuation determining unit may output an electric signal having an intensity variation based on the sub signal from the sub signal outputting unit, which signal serves as a determination signal for the determining of the attenuation, to the variable optical attenuator; and the stabilizing controller may control an intensity of the determination signal that is to be output to the variable optical attenuator such that an amplitude of the attenuation of the variable optical attenuator is stabilized to have a constant ratio to an amplitude of the main signal light.

As a further preferable feature, the attenuation determining unit may output an electric signal having an intensity variation based on the sub signal from the sub signal outputting unit, which signal serves as a determination signal for the determining of the attenuation, to the variable optical attenuator; and the controlling unit may include an amplifier for amplifying the sub signal component measured by the amplitude measuring section at a gain corresponding to the constant ratio, a subtractor for obtaining a difference between the mean intensity measured by the mean intensity measuring section and an amplitude of the sub signal component amplified by the amplifier, and a signal provider for providing the attenuation determining section with a signal for controlling an intensity of the determination signal that is to be output to the variable optical attenuator such that the difference obtained by the subtractor is substantially zero.

In this case, an integral of the difference obtained by the subtractor may serve as the signal for controlling the intensity of the determination signal and may be provided to the attenuation determining section by the signal provider.

As a second generic feature, there is provided a sub signal demodulation apparatus for demodulating a sub signal modulated by a modulator in a sub signal modulation apparatus including a sub signal outputting unit for outputting the sub signal different from a main signal included in main signal light sent from a main signal light transmitter and the modulator for modulating an mean intensity of the main signal light with a intensity variation sufficiently smaller than the mean intensity of the main signal light and with the sub signal from the sub signal outputting unit and outputting signal light obtained by the modulating, the sub signal demodulation apparatus comprising: a branching unit for branching a portion from the signal light output from the modulator; an optical/electrical converter for converting the portion branched into an electric signal; a band-pass filter for extracting a frequency component of the sub signal from the electrical signal obtained by the optical/electrical converter; and a demodulator for demodulating the sub signal on the basis of the frequency component extracted by the band-pass filter.

As a third generic feature, there is provided a sub signal modulation demodulation system comprising: a sub signal modulation apparatus for modulating a sub signal different from a main signal on main signal light which includes the main signal and for sending the transmission signal light in which the main signal and the sub signal are modulated to a sub signal demodulation apparatus; and the sub signal demodulation apparatus for demodulating the sub signal from the transmission signal light sent from the sub signal modulation apparatus, the sub signal modulation apparatus including: a sub signal outputting section for outputting the sub signal; a variable optical attenuator for variably attenuating the main signal light at a response speed lower than ½ of a speed of the main signal and for sending the transmission signal light to the sub signal demodulating apparatus; an attenuation determining unit for determining an attenuation of the variable optical attenuator for the main signal light; and a stabilizing controller for controlling the attenuation determining unit such that an amplitude of the attenuation of the variable optical attenuator is stabilized to have a constant ratio to a mean intensity of the main signal light, the sub signal demodulation apparatus including: a branching unit for branching a portion from the transmission signal light sent from the sub signal modulation apparatus; an optical/electrical converter for converting the portion branched into an electric signal; a band-pass filter for extracting a frequency component of the sub signal from the electrical signal obtained by the optical/electrical converter; and a demodulator for demodulating the sub signal on the basis of the frequency component extracted by the band-pass filter.

Since the stabilizing controller of the present invention can control the attenuation determining section such that an amplitude of the attenuation of the variable optical attenuator is stabilized to have a constant ratio to a mean intensity of the main signal light, it is possible to stabilize, irrespective of the intensity of main signal light, transmission of a sub signal superimposed on the main signal light even when a general-purpose main signal light transmitter is used.

Other objects and further features of the present invention will be apparent from the following detailed description when read in conjunction with the accompanying drawings.

DESCRIPTION OF THE PREFERRED EMBODIMENTS

A preferred embodiment of the present invention will now be described with reference to the accompanying drawings.

The following disclosure concerning one embodiment of the present invention reveals technical problems, means to solve the technical problems and advantages of the present invention in addition to the above objects of the present invention.

(A) First Embodiment

Figure 1:
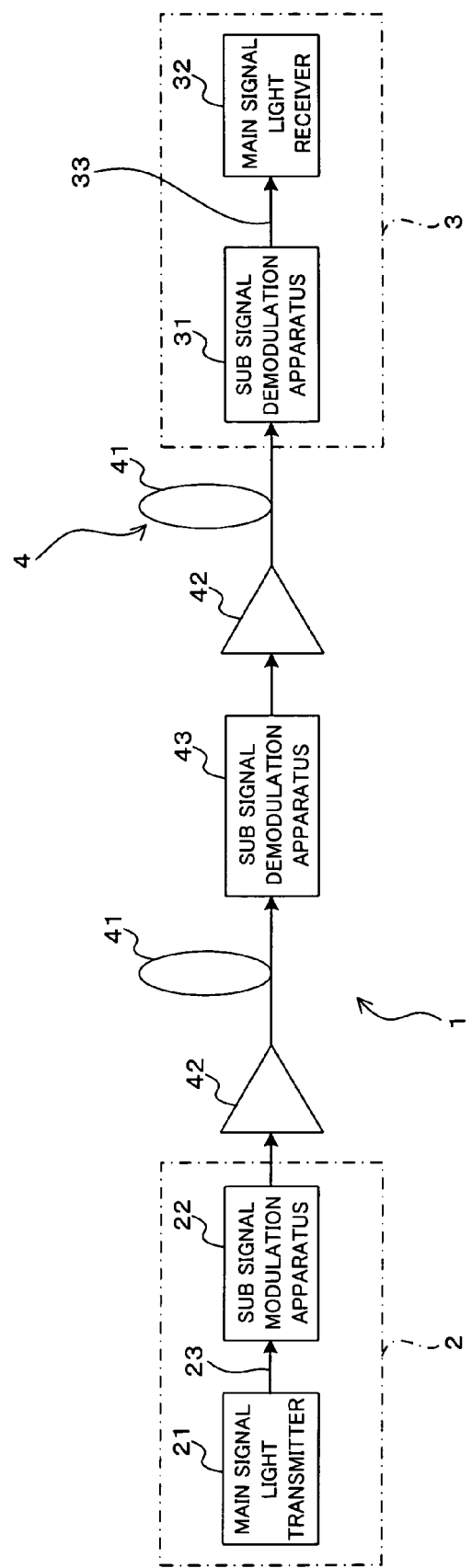
FIG. 1 is a block diagram schematically showing an optical communication system according to a first embodiment of the present invention.

FIG. 1 schematically shows an optical communication system 1 according to a first embodiment of the present invention. In the optical communication system 1 shown in FIG. 1, a transmitter station 2 and a receiver station 3 are connected by an optical transmission path 4, which includes optical fibers 41 and an optical amplifier 42 interposed between the optical fibers 41 and which transmits light signals from the transmitter station 2 to the receiver station 3.

The transmitter station 2 includes a main signal light transmitter 21 for outputting main signal light to be transmitted to a receiver station 3 and a sub signal modulation apparatus 22 for modulating the main signal light from the main signal light transmitter 21 by a sub signal and transmitting the modulated main signal to the receiver station 3. By way of an example, a general-purpose MSA transceiver can be used as the main signal light transmitter 21.

Here, a sub signal is different from a main signal serving as a data signal, and is not limited in type or kind of data. For example, a sub signal may be exemplified by information on the wavelength of main signal light or on the quality of a main signal which information has relation to the main signal, or by data on maintenance of the transmitter station 2 which data has no relation to the main signal.

Further, the sub signal modulation apparatus 22 may be formed separately from the main signal light transmitter 21.

In such a case, the sub signal modulation apparatus 22 is connected to the main signal light transmitter 21 by an optical fiber 23 via non-illustrated connectors and is further connected to the optical fiber 41 that forms the optical transmission path 4. With this connection relationship, the sub signal modulation apparatus 22 can receive signal light from the main signal light transmitter 21 and can output signal light, on which a sub signal has been modulated, to the optical fiber 41.

The receiver station 3 includes a sub signal demodulation apparatus 31 for demodulating a sub signal modulated in the sub signal modulation apparatus 22 from the received signal light and receiving the demodulated sub signal, and a main signal light receiver 32 for receiving main signal light. A general-purpose MSA transceiver can be applied also to the main signal light receiver 32.

Further, the sub signal demodulation apparatus 31 may also be formed separately from the main signal light receiver 32 and, in such a case, is connected to the main signal light receiver 32 by an optical fiber 33 via non-illustrated connectors. Additionally, a sub signal demodulation apparatus 43 that serves as a relay station can be placed on the optical transmission path 4 as required in order to demodulate a sub signal modulated by the sub signal modulation apparatus 22 and receive the modulated sub signal.

With this configuration, the optical communication system 1 shown in FIG. 1 can send signal light, on which a sub signal has been modulated with a main signal, from the transmitter station 2 and can receive the signal light in the receiver station 3. In other words, main signal light is sent and received between the main signal light transmitter 21 and the main signal light receiver 32; and a sub signal is sent and received between the sub signal modulation apparatus 22 and the sub signal demodulation apparatus 31, which unitedly form a sub signal modulation demodulation system.

Superimposition and separation of a sub signal are performed irrespective of data of a main signal. The connections between the main signal light transmitter 21 and the sub signal modulation apparatus 22 and between the sub signal demodulation apparatus 31 and the main signal light receiver 32 are established by the optical fibers 23, 33 through connectors, respectively. For this reason, a function for transmitting and receiving a sub signal is easily added to a working system for transmitting and receiving main signal light.

The sub signal modulation apparatus 22 includes a sub signal outputting unit 221, a variable optical attenuator (VOA) 222, and a multiplier 223 and a stabilized controlling unit 224 which serve as an attenuation determining unit.

The sub signal outputting unit 221 outputs a sub signal that is to be attached to a main signal included in main signal light transmitted from the main signal light transmitter 21, and includes a sub signal generator (sub signal generating section) 51 for generating the sub signal and a phase modulator (phase modulation section) 52 for performing a phase modulation on the sub signal generated by the sub signal generator 51 and outputting the result of the phase modulation to the multiplier 223. A sub signal to be attached to a main signal can contain adaptive data sent and received between a transmitter station 2 and a receiver station 3 in the event of main signal transmission through the optical transmission path 4, which data is exemplified by monitoring information over the optical transmission path 4.

The variable optical attenuator 222 variably attenuates main signal light sent from the main signal light transmitter 21. An attenuation of the variable optical attenuator 222 for main signal light is controlled by the intensity (e.g., a voltage value or a current value) of an electric signal provided from the multiplier 223 to be detailed in later.

Namely, the multiplier 223 determines, in accordance with a sub signal output from the sub signal outputting unit 221, an attenuation that the variable optical attenuator 222 applies to main signal light on which the sub signal is to be superimposed. The signal light variably attenuated by the variable optical attenuator 222 serves as light in which a sub signal is modulated along with a main signal and can be transmitted through the optical transmission path 4.

The variable optical attenuator 222 varies the attenuation at a response speed lower than ½ of a speed of a main signal, so that superimposition of a sub signal on main signal light does not influence at least on the main signal that is modulated in the main signal light.

Here, the multiplier 223 sends the variable optical attenuator 222 an electric signal having an intensity variation based on a sub signal from the sub signal outputting unit 221 which electric signal functions as a determination signal for determining an attenuation of the variable optical attenuator 222. Specifically, the multiplier 223 multiples the sub signal from the sub signal outputting unit 221 by a signal from a later-described stabilized controlling unit 224 and provides the result of the multiplication that is to be serve as the determination signal to the variable optical attenuator 222.

Figure 3A:
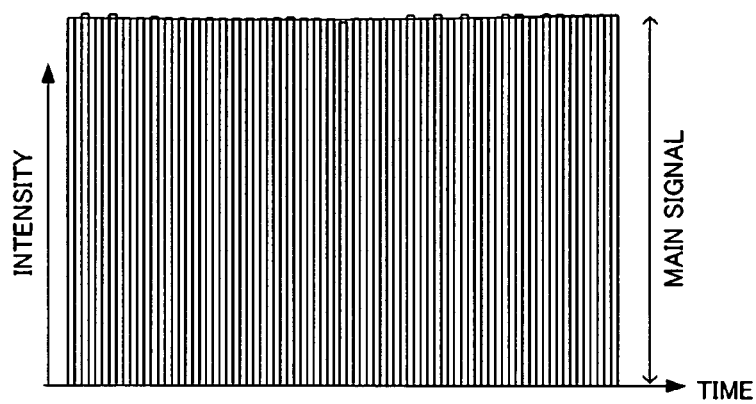
FIGS. 3(a) to 3(e) are diagrams explaining operations carried out in the sub signal modulation apparatus of FIG. 2.
Figure 3B:
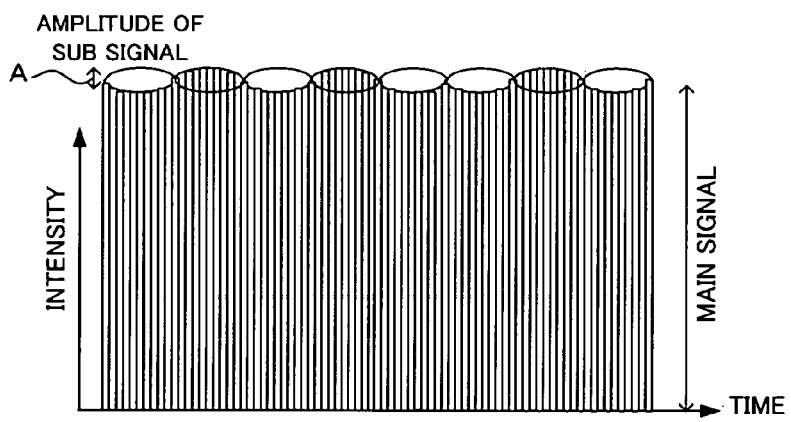
Figure 3C:
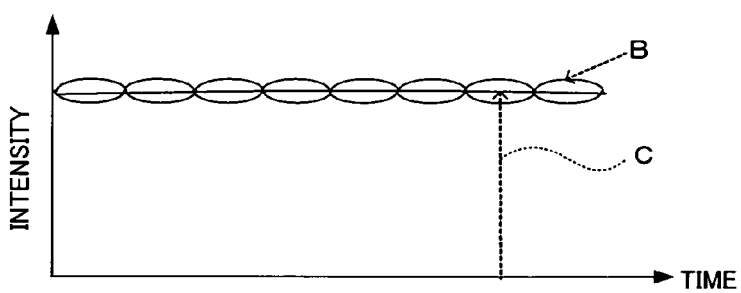
Figure 3D:
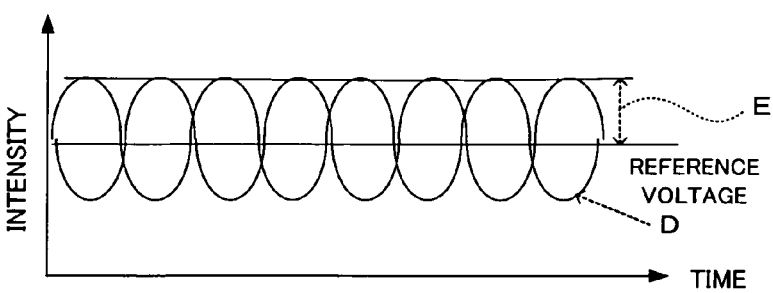
Figure 3E:
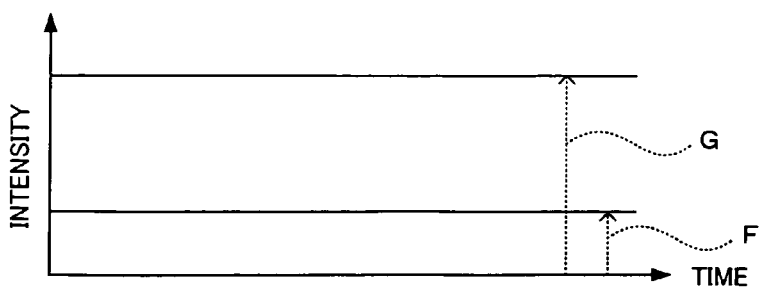

For example, upon receipt of main signal light having an intensity shown in FIG. 3(a) from the main signal light transmitter 21, the variable optical attenuator 222 variably attenuates the received main signal light on the basis of the determination signal from the multiplier 223 and consequently outputs a signal light exemplified by FIG. 3(b) on which the sub signal has been modified. The symbol A in FIG. 3(b) represents an amplitude of the sub signal, which amplitude is controlled by a signal from the stabilized controlling unit 224 so as to have a substantially constant ratio to the mean intensity of the main signal light.

In other words, the stabilized controlling unit 224 controls (feed-back controls) the multiplier 223, which serves as an attenuation determining section, such that an amplitude of the attenuation of the variable optical attenuator 222 is stabilized to have a constant ratio to the mean intensity of main signal light. Namely, a control signal that the stabilized controlling unit 224 provides to the multiplier 223 stabilizes the amplitude of a sub signal to be superimposed on the main signal light to have a constant ratio to the mean intensity of the main signal light. The stabilized controlling unit 224 of the first embodiment includes a branching unit 53, an optical/electrical converter 54, a low-pass filter 55, a band-pass filter 56, a peak detector 57 and a controlling unit 58.

The branching unit 53 branches a portion from signal light which the variable optical attenuator 222 has output to the receiver station 3 through the optical transmission path 4, and the optical/electrical converter 54 converts the signal light portion branched by the branching unit 53 into an electric signal corresponding to the intensity variation of the signal light. For example, the optical/electrical converter 54 measures a level of the light signal portion from branching unit 53 which level includes a variation in level of the subsignal (and which is in the form of an electric signal). For example, the optical/electrical converter 54 can include a photodiode and a circuit for converting an electric signal, in the form of a current signal, from the photodiode into a voltage signal as required.

The low-pass filter 55 smoothes an electric signal from the optical/electrical converter 54 to measure the mean intensity of main signal light that has been output from the variable optical attenuator 222. For example, the low-pass filter 55 can output an electric signal from which a sub signal component has been removed and which have the mean intensity level of the electric signal from the optical/electrical converter 54, as shown by the intensity C in FIG. 3(*c*).

In short, an electric signal output from the low-pass filter 55 can be regarded as an indicator of the mean intensity of the main signal light output from the variable optical attenuator 222 and the low-pass filter 55 therefore functions as a mean intensity measuring section for measuring the mean intensity of signal light output from the variable optical attenuator 222.

Further, the band-pass filter 56 extracts a sub signal component obtained by modulation performed in the variable optical attenuator 222 from an electric signal from the optical/electrical converter 54 and therefore serves as a sub signal component extracting section for extracting a sub signal component from signal light output from the variable optical attenuator 222. An electric signal that is to be output from the band-pass filter 56 is, as shown signal D in FIG. 3(*d*), a sub signal component including a predetermined reference voltage serving as a standard voltage.

The peak detector 57 measures the peak value of the sub signal component extracted by the band-pass filter 56 in the form of a value from which the above reference voltage is subtracted and thereby obtains the amplitude of the sub signal component. Namely, the peak detector 57 functions as an amplitude measuring section for measuring an amplitude of the sub signal component extracted by the band-pass filter 56. For example, from a sub signal component in the form of an electric signal with an intensity variation D in FIG. 3(*d*), the peak detector 57 measures an amplitude value E shown in FIG. 3(*d*) and outputs an electric signal having an intensity F in FIG. 3(*e*).

Figure 2:
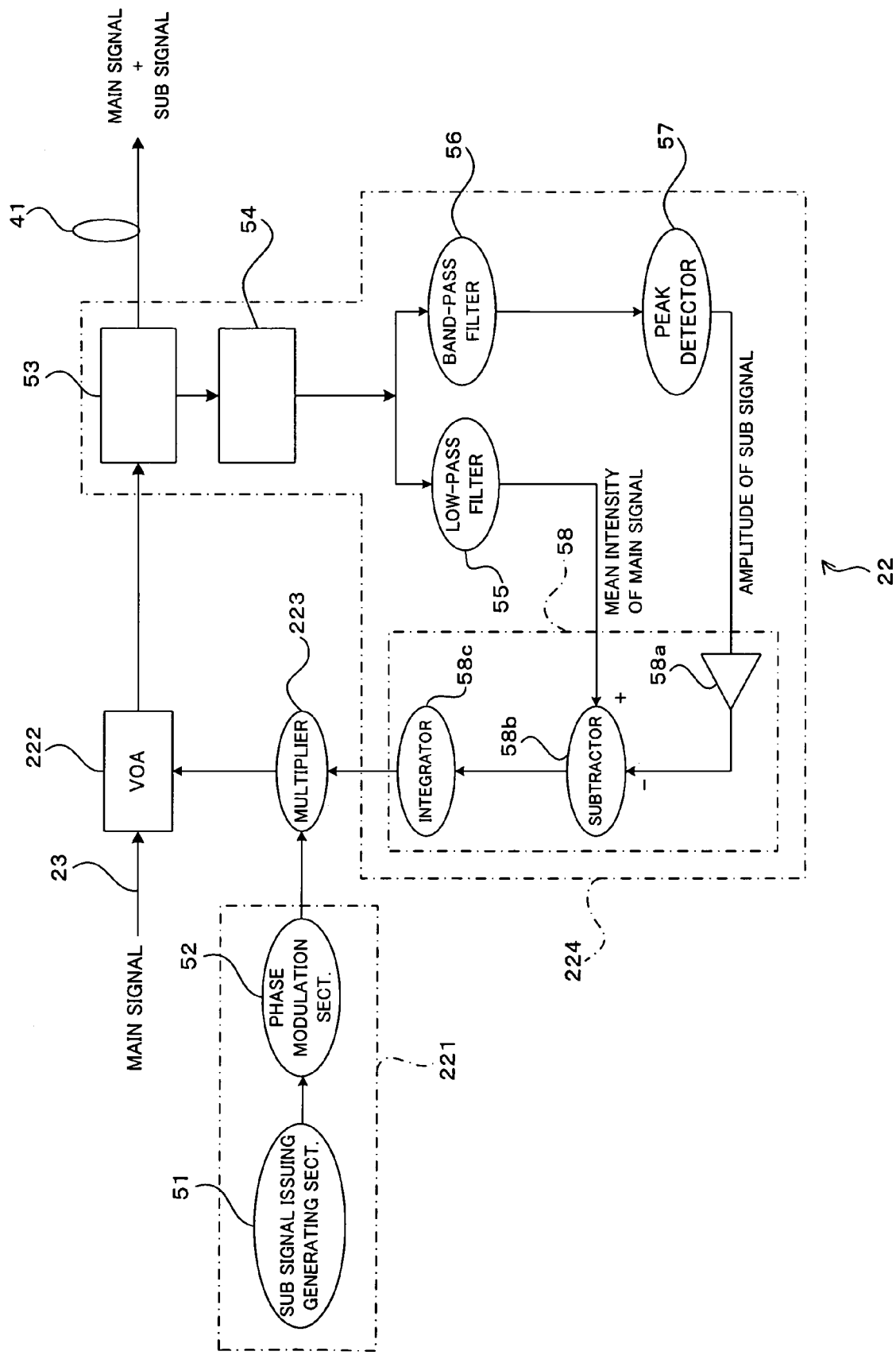
FIG. 2 is a block diagram schematically showing a sub signal modulation apparatus used in the optical communication system of FIG. 1.

Further, the controlling unit 58 shown in FIG. 2 controls the determination of an attenuation carried out in the multiplier 223 such that the amplitude value measured by the peak detector 57 has a constant ratio to the mean intensity measured by the low-pass filter 55. In other words, a signal that the controlling unit 58 outputs to the multiplier 223 is regarded as a determination signal that stabilizes the amplitude of an attenuation of the variable optical attenuator 222 to have a constant ratio to an amplitude of main signal light. As shown in FIG. 2, the controlling unit 58 includes an amplifier 58*a*, a subtractor 58*b* and an integrator 58*c*.

Here, the amplifier 58*a* amplifies the amplitude of the sub signal component which amplitude is detected by the peak detector 57 at an amplifying ratio (gain) corresponding to the constant ratio. That is, there is a correlation between the amplifying ration and the ratio of the_mean intensity of the main signal light. For example, the reciprocal of a ratio that makes the amplitude of the sub signal component constant to the main signal component from the variable optical attenuator 222 is regarded as an amplifying ratio of the level of an outputting signal against the level of the inputting signal. By way of example, if an object amplitude of the sub signal component is 2 percent (²/₁₀₀) that is constant to the main signal component from the variable optical attenuator 222, the amplifier 58*a* sets an amplifying ratio of the level of an outputting signal against the level of the inputting signal to be "50" that is the reciprocal of ²/₁₀₀.

The subtractor 58*b* carries out an operation to obtain a difference between the intensity of main signal light detected by the low-pass filter 55 and the amplitude of the sub signal component amplified by the amplifier 58*a*, and sends the obtained difference to the integrator 58*c*. For example, the amplitude G, shown in FIG. 3(*e*), of the sub signal component after subjected to amplification is subtracted from the mean intensity C, shown in FIG. 3(*c*), of the main signal light and the result of the subtraction is sent to the integrator 58*c*.

The integrator 58*c* integrates the result of the operation carried out by the subtractor 58*b* and provides the multiplier 223 with the result of the integration serving as a controlling signal in order to control the multiplier 223, whereupon it is possible to control the attenuation of the variable optical attenuator 222 using the multiplier 223 such that the result of a subtraction in the subtractor 58*b* becomes approximately equal to zero. In other words, the integrator 58*c* serves to function as a signal provider for providing the multiplier 223 with a signal which controls an intensity of a determination signal that is to be provided to the variable optical attenuator 222 such that the result of an operation in the subtractor 58*b* becomes substantial zero and that the amplitude of a sub signal to be modulated by attenuating in the variable optical attenuator 222 has a constant ratio to the mean intensity of the main signal light.

Figure 4:
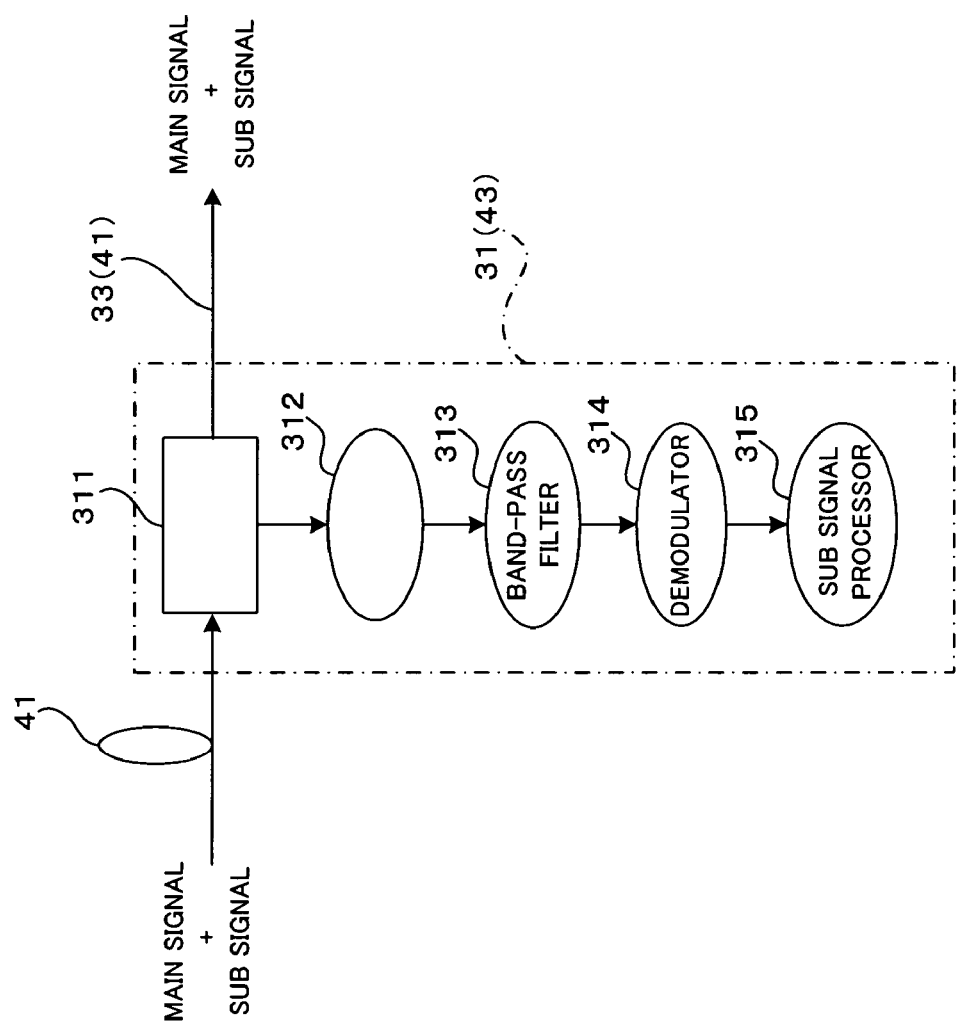
FIG. 4 is a block diagram schematically showing a sub signal demodulation apparatus used in the optical communication system of FIG. 1.

The sub signal demodulation apparatus 31 (or the sub signal demodulation apparatus 43 serving as a relay station) shown in FIG. 1 demodulates and receives a sub signal modulated in the above sub signal modulation apparatus 22, and includes a branching unit 311, an optical/electrical converter 312, a band-pass filter 313, a demodulator 314 and a sub signal processor 315, as shown in FIG. 4. Here, the branching unit 311, the optical/electrical converter 312, and the band-pass filter 313 are identical in configuration to the branching unit 53, the optical/electrical converter 54, and the band-pass filter 56 that are included in the above sub signal modulation apparatus 22, respectively.

The demodulator 314 demodulates the sub signal component extracted by the ban-pass filter 313 in order to reproduce the sub signal that has been generated in the sub signal generator 51. In the demodulator 314, a phase demodulation is performed on the sub signal on which a phase modulation has been performed in the phase modulation section 52.

Thereby, the sub signal processor 315 receives the sub signal that has been demodulated in the demodulator 314 and executes an operation on the basis of the received sub signal. For example, if the sub signal includes monitoring information over the optical transmission path 4, the sub signal processor 315 carries out maintenance or other operation on the optical transmission path 4 using the monitoring information.

With the above configuration in the first embodiment, an arrangement of the sub signal modulation apparatus 22 downstream of the main signal light transmitter 21 along a direction of signal light transmission and an arrangement of the sub signal demodulation apparatus 31 upstream of the main signal light receiver 32 along the direction realize sub signal transmission between the sub signal modulation apparatus 22 and the sub signal demodulation apparatus 31 when communication using main signal light is carried out between the main signal light transmitter 21 and the main signal light receiver 32. Since the sub signal may include monitoring information over the optical transmission path 4, sending and receiving of the sub signal can realize maintenance on the transmission path.

In the sub signal modulation apparatus 22 of the illustrated example, a sub signal output from the sub signal outputting unit 221 is modulated with main signal light having a data speed of about, for example, 10 Gbps and being sent from the main signal light transmitter 21 by an attenuating operation carried out in the variable optical attenuator 222.

At that time, the phase modulation section 52 of the sub signal outputting unit 221 performs a phase modulation on a sub signal that has been generated by the sub signal generator 51 and the phase-modulated sub signal is modulated by controlling an attenuating operation in the variable optical attenuator 222.

If an amplitude modulation is adopted to modulate a sub signal generated by the sub signal generator 51, a modulation amplitude that is to be detected by a circuit varies due to a mark ratio of data and a succession of the same code and a restriction on an arrangement of data codes to be sent is therefore required. If a frequency modulation is adopted, attention has to be paid such that variation in frequency does not adversely affect control for an amplitude or another operation. Conversely, the adoption of a phase modulation to modulate a sub signal generated by the sub signal generator 51 can not only reduce an error rate of data coding but also simplify the circuit for amplitude control as compared to amplitude modulation and frequency modulation. That less restricts a code arrangement of data to be sent.

Further, if the variable optical attenuator 222 allows a variation range of 10 dB or larger and a response speed of approximate 1 ms, the modulation frequency of the sub signal can be restricted to 10 kHz or smaller. At that time, the stabilized controlling unit 224 sends the multiplier 223 a signal that determines an amplitude of an attenuation of the variable optical attenuator 222 so that the amplitude of the attenuation is stabilized to have a constant ratio (e.g. approximate 2 percent) to the mean intensity of the main signal light.

Thereby, it is possible to keep a substantial constant ratio of an amplitude of a sub signal included in signal light output from the 222 to the mean intensity of a main signal light included in the signal light. Further, in accordance with the mean intensity of the main signal light to be output from the main signal light transmitter 21, a sub signal that is to be superimposed can have a relative ratio constant to the main signal light.

Namely, despite possible difference in the mean intensity of main signal light and in the characteristic of the variable optical attenuator 222 due to an individual difference or the variation in temperature, it is possible to accurately keep the amplitude of a sub signal to have a predetermined ratio constant to the mean intensity of the main signal light as long as the circuit is in the operable range.

Figure 5:
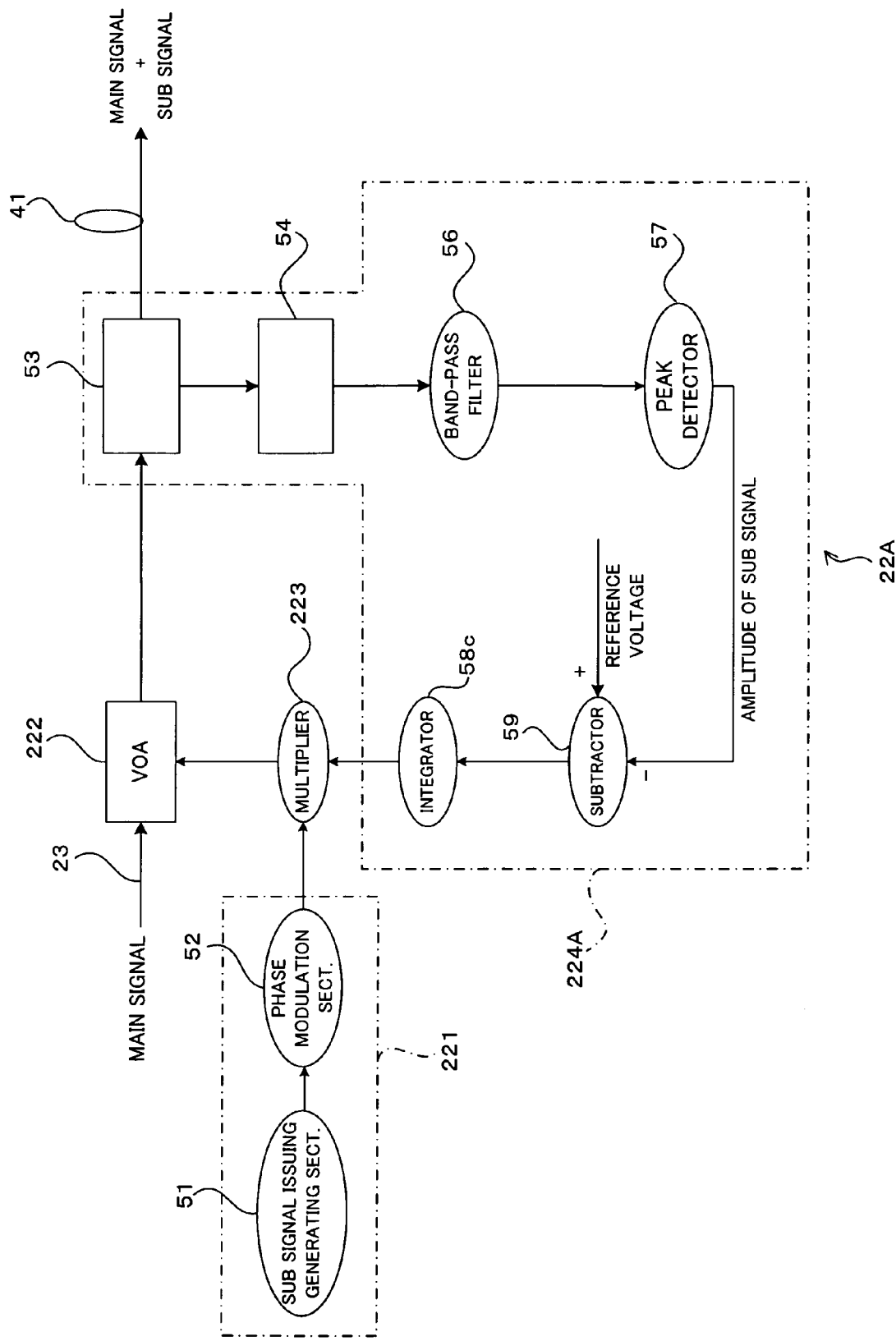
FIG. 5 is a block diagram schematically showing a sub signal modulation apparatus for comparison with the result obtained by the first embodiment.

By the way, FIG. 5 shows a sub signal modulation apparatus 22A including a feedback controller 224A for controlling the amplitude of a sub signal that is to be modulated by the variable optical attenuator 222 so that the amplitude has a constant value irrespective of the mean intensity of main signal light, differently from the first embodiment above described. The sub signal modulation apparatus 22A includes a feedback controller 224A serving as a substitute for the stabilized controlling unit 224 of FIG. 2. Elements and parts in FIG. 5 with identical reference numbers in FIG. 2 designate similar or substantially similar elements and parts described with reference to FIG. 2.

A subtractor 59 in the feedback controller 224A shown in FIG. 5 performs a subtraction between a reference voltage to which a sub signal is contolled and an amplitude of the sub signal. In other words, in the feedback controller 224A, an amplitude of an attenuation of the variable optical attenuator 222 is controlled by a determination signal provided to the multiplier 223 such that the result of the subtraction in the subtractor 59 becomes zero.

In this case, since an intensity ratio of a sub signal with respect to the main signal light varies with the intensity of the main signal light differently from the sub signal modulation apparatus 22 of the first embodiment shown in FIG. 2, designing for a communication system is restricted in order to receive also a sub signal without affecting reception of main signal light.

Conversely, the sub signal modulation apparatus 22 shown in FIG. 2 does not vary the ratio of the amplitude of a sub signal to main signal light. Therefore the sub signal demodulation apparatus 31 (or 43) is stable in sub signal reception and can be stable also in main signal light reception because an amplitude of the sub signal does not affect the main signal light reception in the main signal light receiver 32.

As described above, according to the first embodiment of the present invention, since the stabilized controlling unit 224 controls the multiplier 223 such that the amplitude of an attenuation of the variable optical attenuator 222 is stabilized to have a constant ratio to the mean intensity of main signal light, it is advantageously possible for a general-purpose transmitter for main signal light to stably transmit a sub signal that has been superimposed on the main signal light irrespective of the intensity of the main signal light.

(B) Others

The present invention should by no means be limited to this foregoing embodiment, and various changes or modifications may be suggested without departing from the gist of the invention.

For example, the sub signal outputting unit 221 may output a subsignal obtained by multiplexing a number of signals different in modulation frequency for a single main signal. In this case, the band-pass filter 56 serving as a sub signal extracting section for the stabilized controlling unit 224 and the band-pass filter 313 of the sub signal demodulation apparatus 31 have to adjust a passband in keeping with frequencies of the sub signal to be extracted.

In the above example, the sub signal modulation apparatus 22 is placed in the transmitter station 2. Alternatively, a sub signal modulation apparatus may be placed in a relay station on the optical transmission path 4, depending on the specification of an optical communication system to which the present invention is applied.

What is claimed is:

1. A sub signal modulation apparatus comprising:

a sub signal outputting unit outputting a sub signal different from a main signal;

a variable optical attenuator variably attenuating the main signal light, into which the main signal has been modulated, at a response speed lower than ½ of a speed of the main signal;

an attenuation determining unit determining, in accordance with the sub signal output from said sub signal outputting unit, an attenuation of said variable optical attenuator for the main signal light; and a stabilizing controller controlling said attenuation determining unit such that an amplitude of the attenuation of said variable optical attenuator is stabilized to have a constant ratio to a mean intensity of the main signal light, wherein said stabilizing controller includes:

a mean intensity measuring section measuring a mean intensity of a signal light output from said variable optical attenuator;

a sub signal component extracting section extracting a sub signal component from the signal light output from said variable optical attenuator;

an amplitude measuring section measuring an amplitude of the sub signal component extracted by said sub signal component extracting section; and a controlling unit controlling the determining of the attenuation in said attenuation determining unit such that the amplitude measured by said amplitude measuring section has a constant ratio to the mean intensity measured by said mean intensity measuring section, wherein said attenuation determining unit outputs an electric signal having an intensity variation based on the sub signal from said sub signal outputting unit, which signal serves as a determination signal for the determining of the attenuation, to said variable optical attenuator; and said controlling unit includes:

an amplifier amplifying the sub signal component measured by said amplitude measuring section at a gain corresponding to the constant ratio, a subtractor obtaining a difference between the mean intensity measured by said mean intensity measuring section and an amplitude of the sub signal component amplified by said amplifier; and a signal provider providing said attenuation determining unit with a signal for controlling an intensity of the determination signal that is to be output to said variable optical attenuator such that the difference obtained by said subtractor is substantially zero, wherein said signal provider integrates the difference from said subtractor and provides said attenuation determining unit with an integrated result as the controlling signal, and said attenuation determining unit multiplies the sub signal from said sub signal outputting unit by the controlling signal and provides said variable optical attenuator with a multiplied result as the determination signal.

2. A sub signal modulation apparatus according to claim 1, wherein said sub signal outputting section includes:

a sub signal generating section for generating the sub signal;

a phase modulation section for performing phase modulation on the sub signal generated by said sub signal generating section and for sending a result of the phase modulation to said attenuation determining unit.

3. A sub signal modulation demodulation system comprising:

a sub signal modulation apparatus modulating a sub signal different from a main signal on a main signal light which includes the main signal and for sending a transmission signal light in which the main signal and the sub signal are modulated to a sub signal demodulation apparatus;

and said sub signal demodulation apparatus demodulating the sub signal from the transmission signal light sent from said sub signal modulation apparatus, said sub signal modulation apparatus including:

a sub signal outputting section outputting the sub signal;

a variable optical attenuator variably attenuating the main signal light at a response speed lower than ½ of a speed of the main signal and for sending the transmission signal light to said sub signal demodulating apparatus;

an attenuation determining unit determining an attenuation of said variable optical attenuator for the main signal light; and a stabilizing controller controlling said attenuation determining unit such that an amplitude of the attenuation of said variable optical attenuator is stabilized to have a constant ratio to a mean intensity of the main signal light, said sub signal demodulation apparatus including:

a branching unit branching a portion from the transmission signal light sent from said sub signal modulation apparatus;

an optical/electrical converter converting the portion branched into an electric signal;

a band-pass filter extracting a frequency component of the sub signal from the electrical signal obtained by said optical/electrical converter; and a demodulator demodulating the sub signal on the basis of the frequency component extracted by said band-pass filter, wherein said stabilizing controller includes:

a mean intensity measuring section measuring a mean intensity of signal light output from said variable optical attenuator;

a sub signal component extracting section extracting a sub signal component from the signal light output from said variable optical attenuator;

an amplitude measuring section for measuring an amplitude of the sub signal component extracted by said sub signal component extracting section; and a controlling unit controlling the determining of the attenuation in said attenuation determining unit such that the amplitude measured by said amplitude measuring section has a constant ratio to the mean intensity measured by said mean intensity measuring section, wherein said attenuation determining unit outputs an electric signal having an intensity variation based on the sub signal from said sub signal outputting unit, which signal serves as a determination signal for the determining of the attenuation, to said variable optical attenuator; and said controlling unit includes:

an amplifier amplifying the sub signal component measured by said amplitude measuring section at a pain corresponding to the constant ratio;

a subtractor obtaining a difference between the mean intensity measured by said mean intensity measuring section and an amplitude of the sub signal component amplified by said amplifier; and a signal provider providing said attenuation determining unit with a signal for controlling an intensity of the determination signal that is to be output to said variable optical attenuator such that the difference obtained by said subtractor is substantially zero, wherein said signal provider integrates the difference from said subtractor and provides said attenuation determining unit with an integrated result as the controlling signal, and said attenuation determining unit multiplies the sub signal from said sub signal outputting unit by the controlling signal and provides said variable optical attenuator with a multiplied result as the determination signal.

4. An apparatus comprising:

a sub signal outputting unit outputting a sub signal;

a variable optical attenuator;

an attenuation determining unit determining, according to the sub signal, an attenuation of said variable optical attenuator; and a controlling unit comprising:

an amplifier amplifying a sub signal component measured by an amplitude measuring section at a gain corresponding to a constant ratio, a subtractor obtaining a difference between a mean intensity measured by a mean intensity measuring section and an amplitude of the sub signal component amplified by the amplifier, and a signal provider providing the attenuation determining unit with a signal for controlling an intensity of a determination signal that is to be output to the variable optical attenuator such that the difference obtained by said subtractor is substantially zero, wherein said signal provider integrates the difference from said subtractor and provides the attenuation determining unit with an integrated result as a controlling signal, and said attenuation determining unit multiplies the sub signal by the controlling signal and provides the variable optical attenuator with a multiplied result as the determination signal.

* * * * *

UNITED STATES PATENT AND TRADEMARK OFFICE
CERTIFICATE OF CORRECTION

PATENT NO.        : 7,457,549 B2
APPLICATION NO.   : 11/211492
DATED             : November 25, 2008
INVENTOR(S)       : Youhei Koganei It is certified that error appears in the above-identified patent and that said Letters Patent is hereby corrected as shown below:

Column 11, Line 6, change "ratio," to --ratio;--.

Column 12, Line 23, change "pain" to --gain--.

Signed and Sealed this

Twenty-fourth Day of February, 2009

JOHN DOLL
*Acting Director of the United States Patent and Trademark Office*